Oct. 30, 1923.
C. GREEN
1,472,594
WHEEL FOR ROAD VEHICLES
Filed March 22, 1923
5 Sheets-Sheet 1
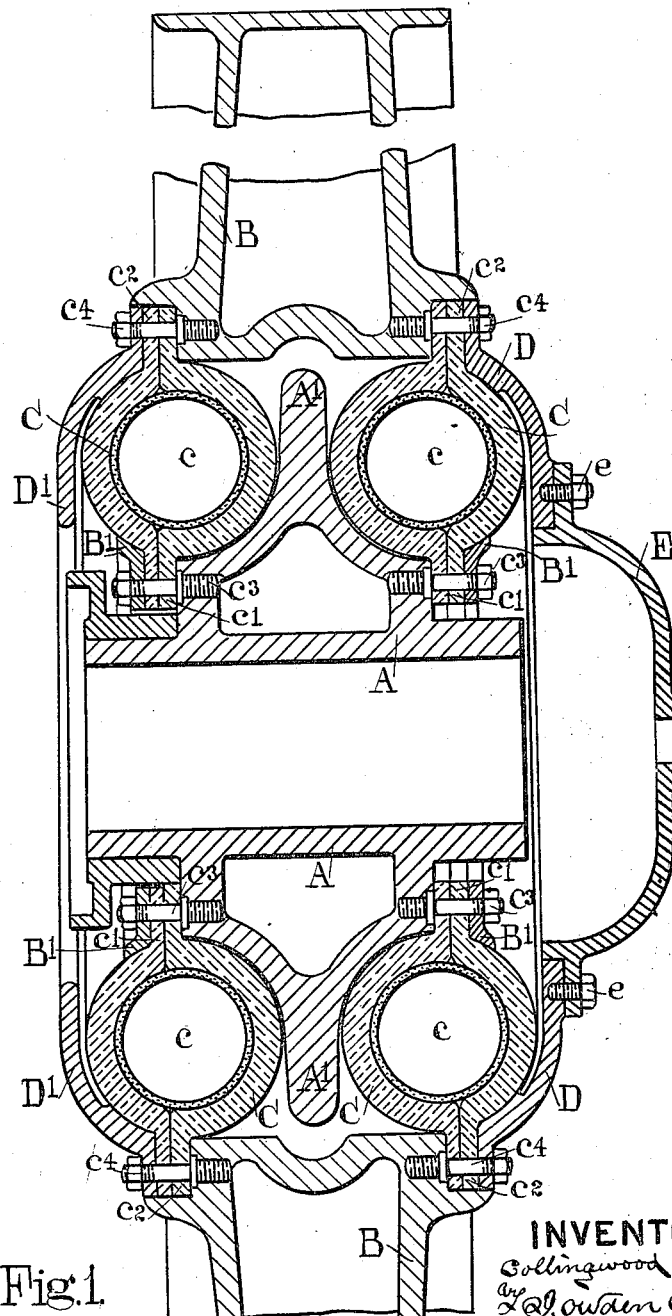
Fig.1
INVENTOR
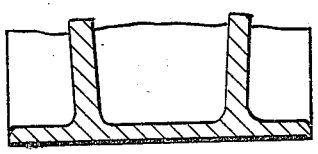

Oct. 30, 1923.

C. GREEN 1,472,594

WHEEL FOR ROAD VEHICLES

Filed March 22, 1923

INVENTOR

Patented Oct. 30, 1923.

1,472,594

UNITED STATES PATENT OFFICE.

COLLINGWOOD GREEN, OF BOLTON, ENGLAND.

WHEEL FOR ROAD VEHICLES.

Application filed March 22, 1923. Serial No. 626,930.

*To all whom it may concern:*

Be it known that I, COLLINGWOOD GREEN, a British subject, residing at Bolton, county of Lancaster, England, have invented certain new and useful Improvements in or Appertaining to Wheels for Road Vehicles, of which the following is a specification.

This invention relates to improvements in wheels for vehicles of the type formed with a hub and an outer part carrying the felloe in floating relation to one another with pneumatic means between them and connected together by annular pieces of leather or other pliable material enclosing the pneumatic means.

According to the present invention the hub part is formed with a central annular radial flange or projection which projects outwards between the annular connecting strips to form a guide for the relative radial movement of the two parts and prevent lateral movement thereof.

The invention will be described with reference to the accompanying drawings.

Fig. 1 is a vertical section through the wheel.

Figure 2:
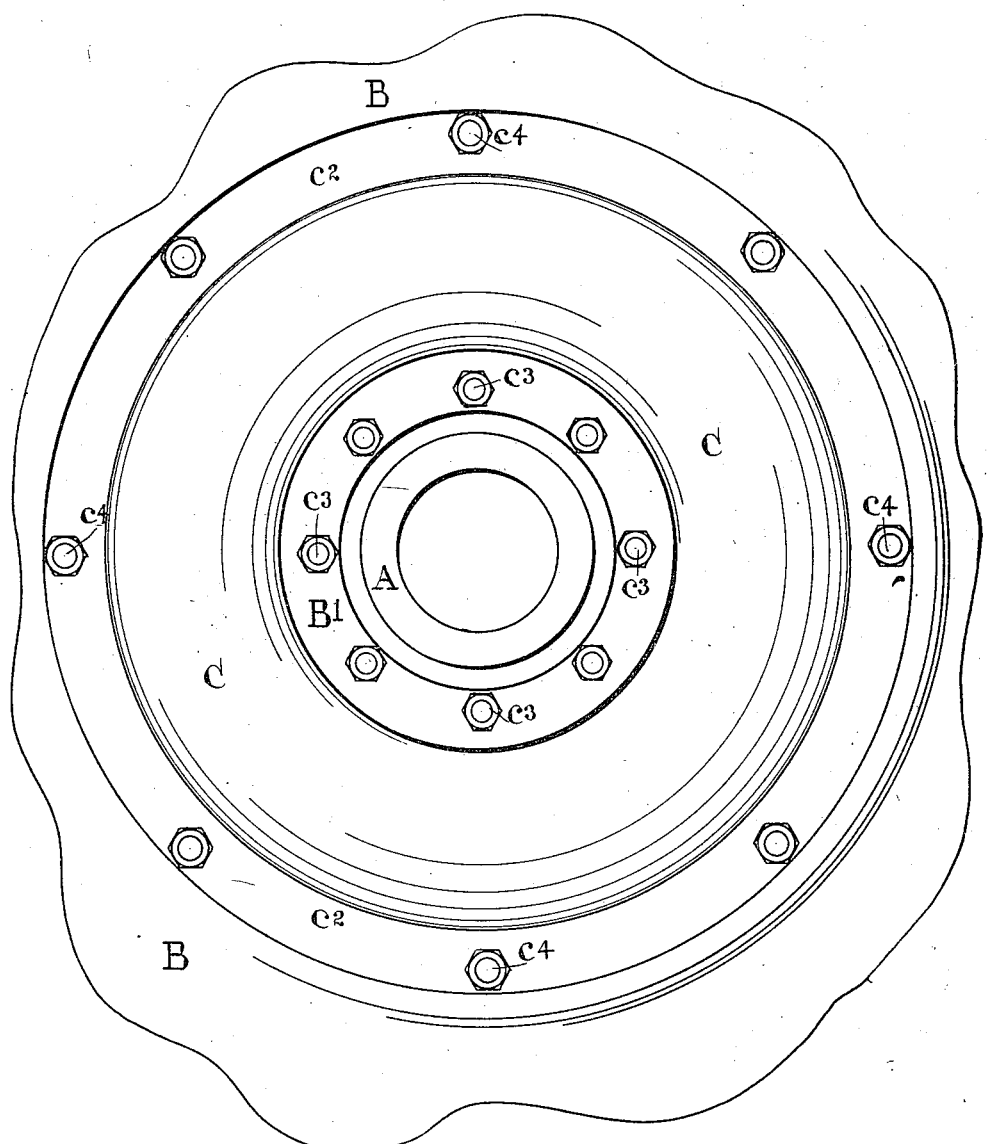
Fig. 2 is a front view thereof with end plates D, E removed.
Figure 4:
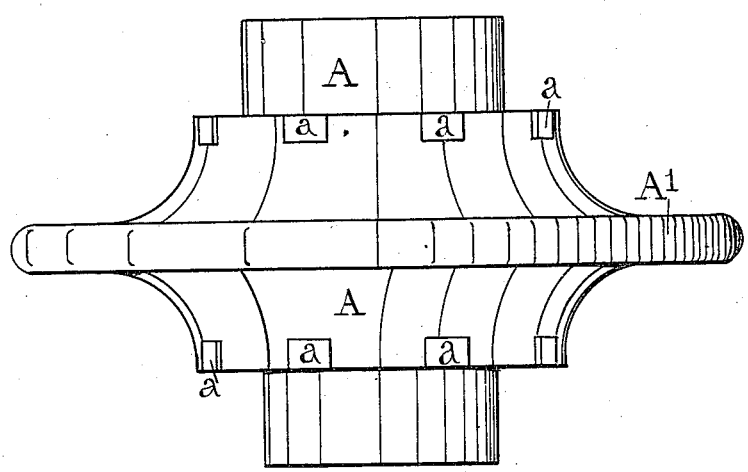
Fig. 4 is a plan of hub part A.
Figure 3:
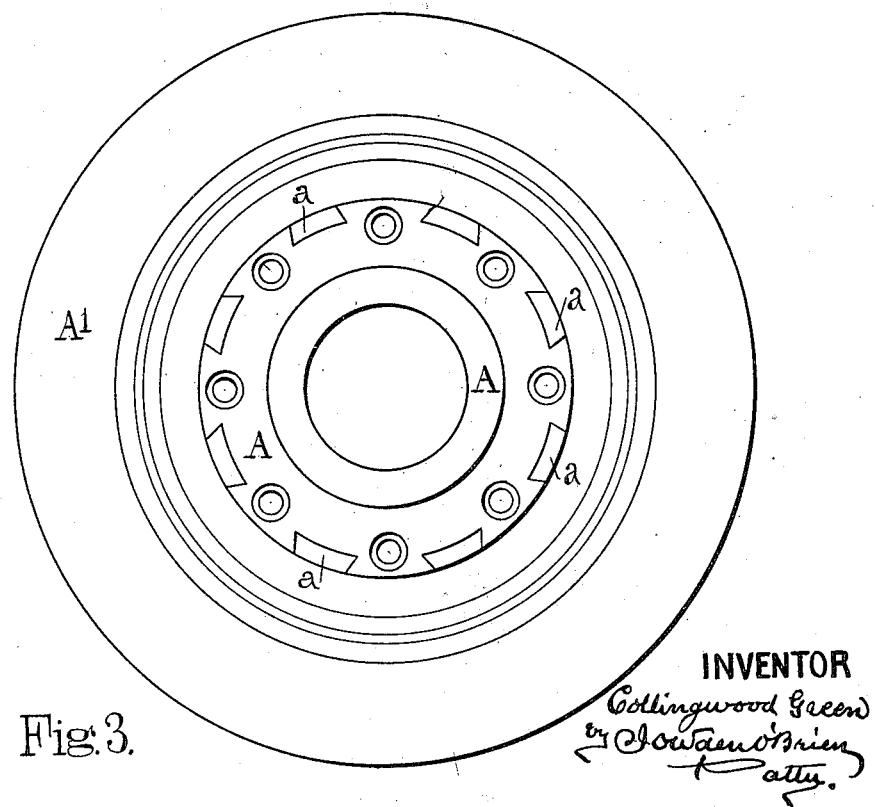
Fig. 3 is a side elevation of hub part A.
Figure 5:
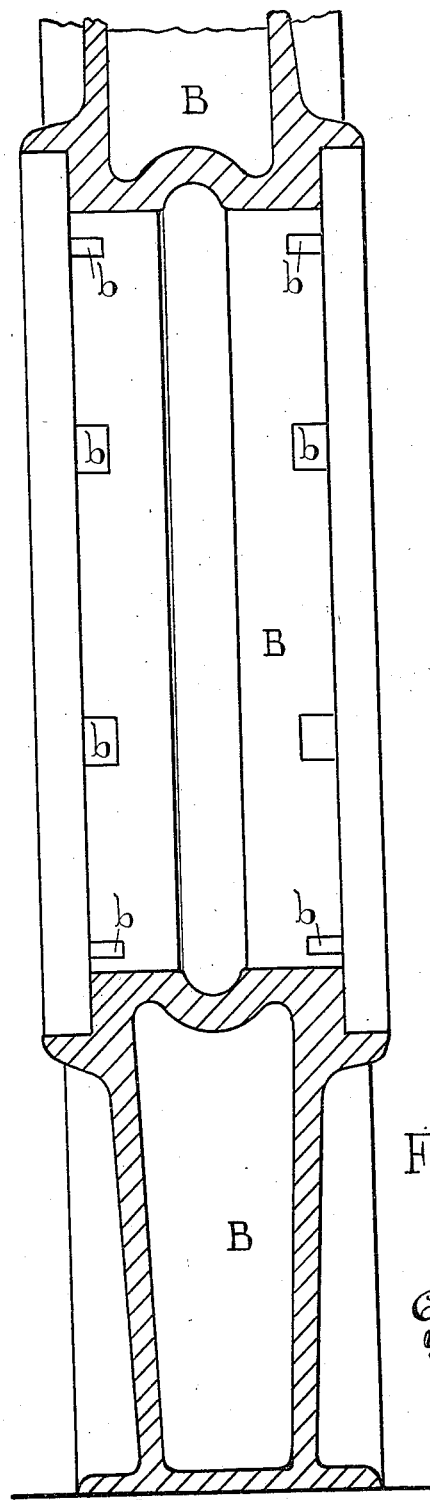
Fig. 5 is a vertical section of the outer part B carrying the felloe.
Figure 6:
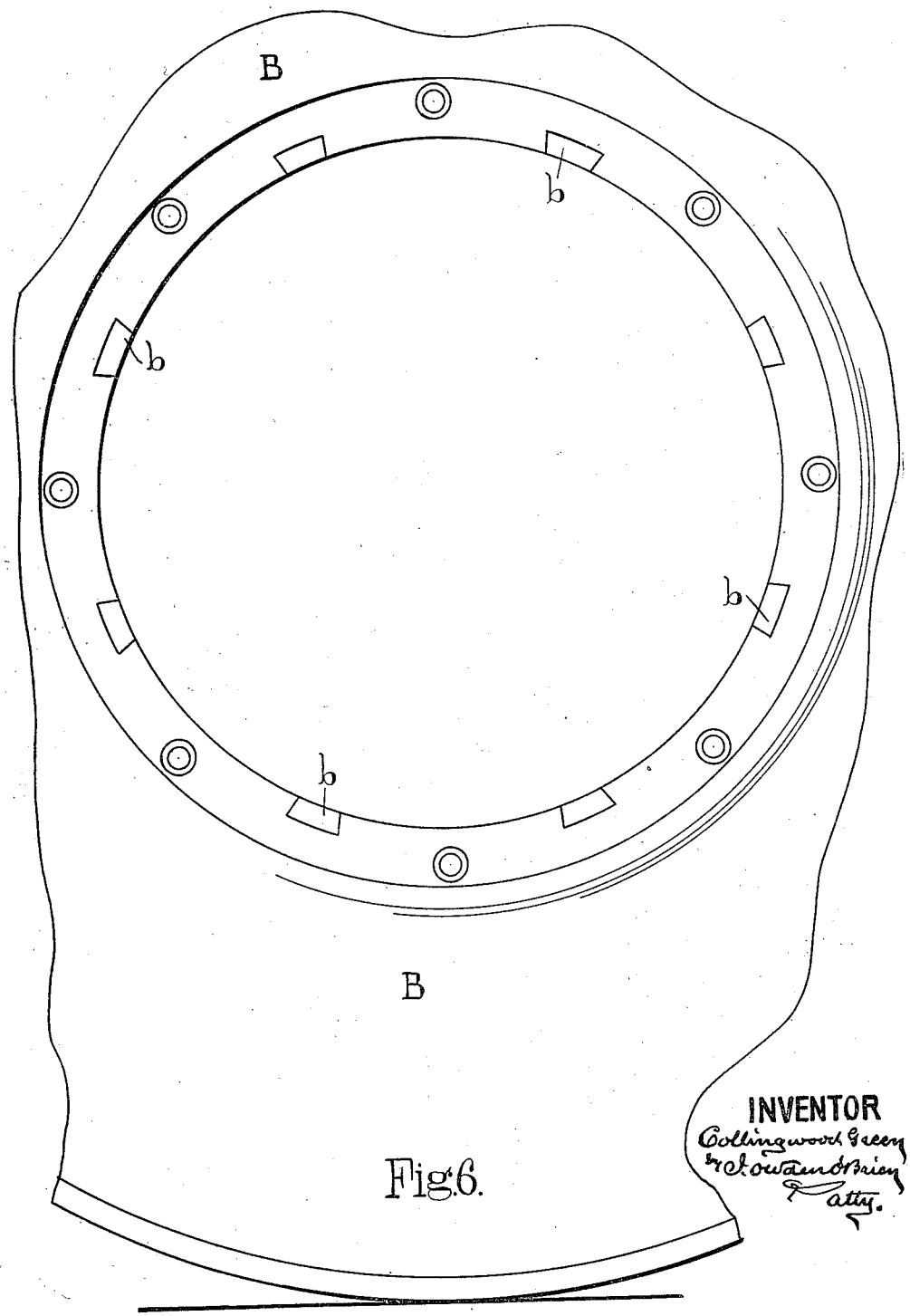
Fig. 6 is a front view of part B.

The wheel is formed of a hub part A and an outer part B which carries the felloe. The two are connected together by annular strips of leather or other pliable material C of U or approximately U shape being arranged in pairs to form annular chambers $c$ in which the pneumatic cushions or devices are arranged. The leather strips C are formed with flanges $c'$ $c^2$ by which they are bolted to the hub part A and part B respectively by bolts $c^3$ and $c^4$ the former of which passes through retaining rings B'.

Recesses $a$ are formed in the hub part A and similar recesses $b$ are formed in the part B to receive projections on the strips C to prevent creeping or stretching of the latter.

The hub part A is formed with a central outwardly projecting annular flange A' which projects outwards between the two pairs of leather strips C. The flange A' is of such a thickness that when the pneumatic cushions carried in the space $c$ are inflated the sides of the strips C will be in contact with the sides of the flange A' thus preventing lateral movement between the parts A and B but allowing vertical movement at right angles to the axle of the vehicle.

A plate D at the front and similar plate D' at the back are affixed to the part B by the bolts affixing the leather connecting pieces thereto and a cap E is affixed to the front plate D by bolts or screws $e$. An oil retaining ring is carried on the hub part A at the inner side of the wheel.

What I claim as my invention and desire to protect by Letters Patent is.

In a vehicle wheel of the type referred to the combination with the hub part, of an outer part carrying the felloe, two pairs of annular strips of pliable material connecting the two parts together, a central flange on the hub part projecting outwards between the pairs of annular strips which by contact with the inner strip of each pair forms a guide for the radial movement of the two parts and prevents lateral movement thereof, plates at the front and back of the wheel affixed to the felloe carrying part by the bolts affixing the outer annular strips thereto and a cap affixed to the front plate.

In testimony whereof I have hereunto set my hand in presence of two subscribing witnesses.

COLLINGWOOD GREEN.

Witnesses:
I. OWDEN O'BRIEN,
GEORGE H. O'BRIEN.